June 30, 1959 K. W. DUDLEY 2,892,598
CABLE DRUM GROOVING
Filed May 24, 1956 4 Sheets-Sheet 1
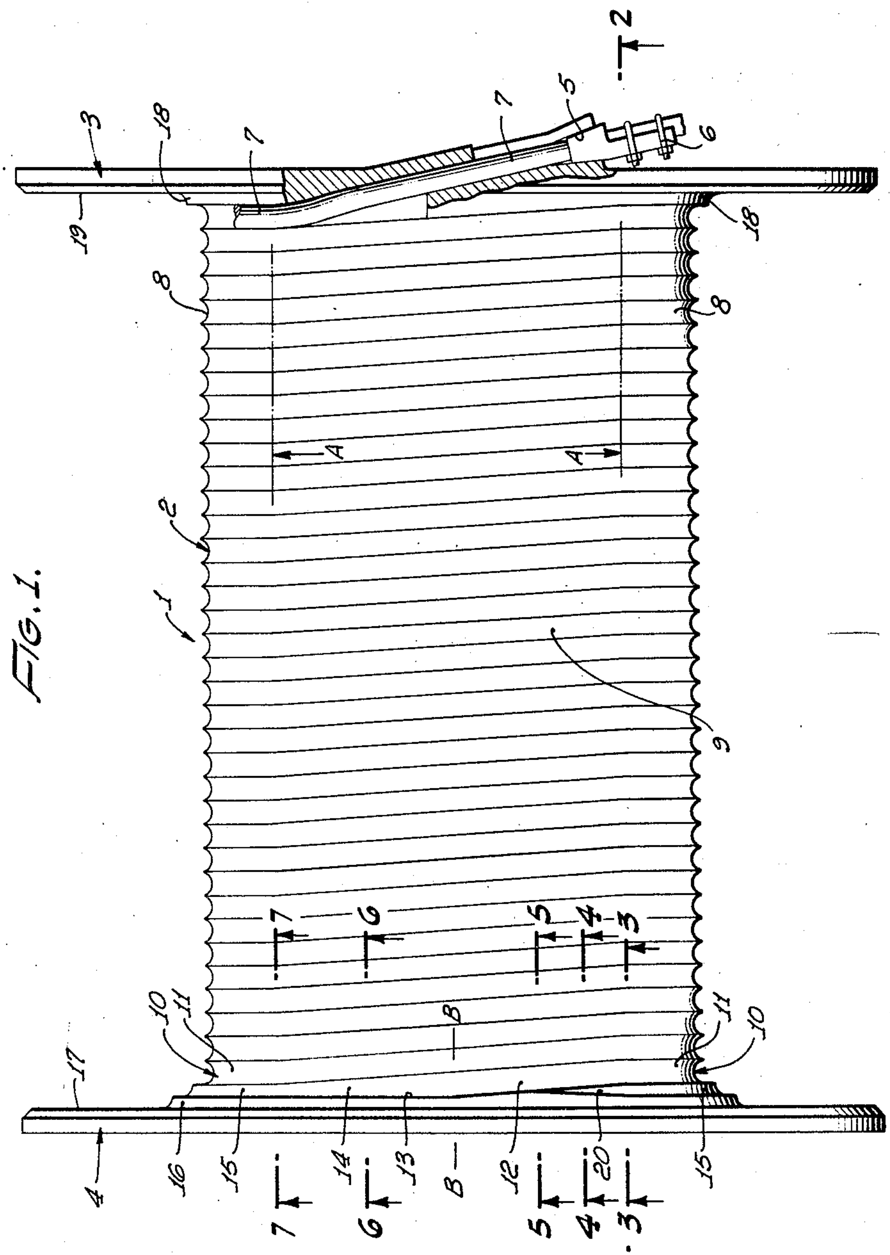
KENNETH W. DUDLEY
INVENTOR.
BY Lyon & Lyon
ATTORNEYS.

June 30, 1959 K. W. DUDLEY 2,892,598
CABLE DRUM GROOVING
Filed May 24, 1956 4 Sheets-Sheet 2
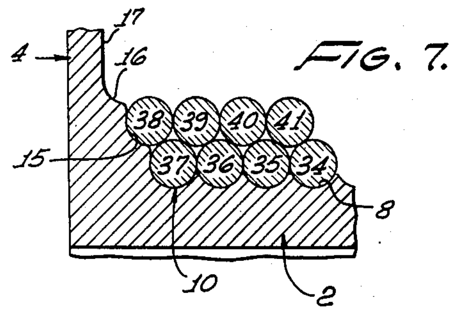
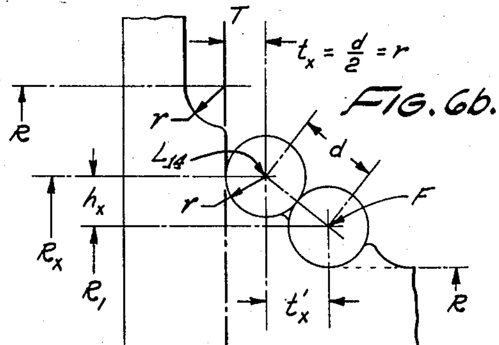
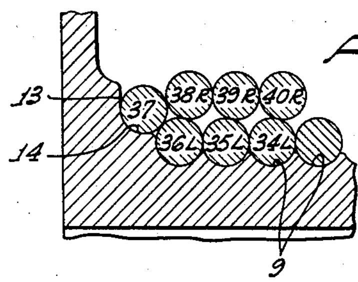
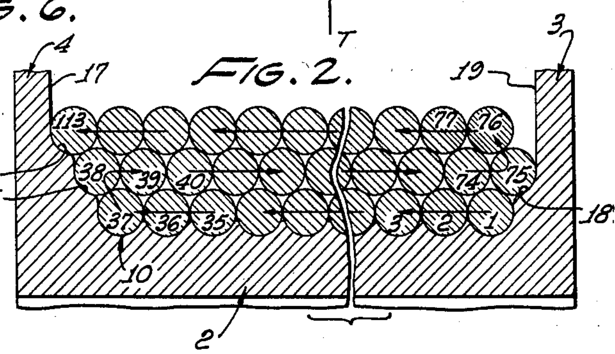
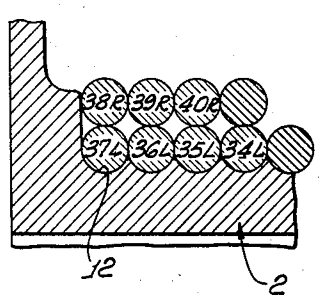
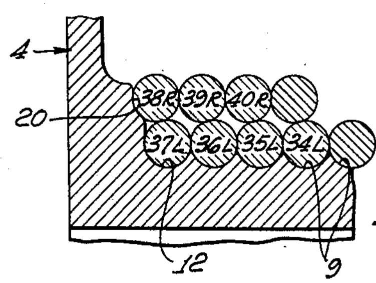
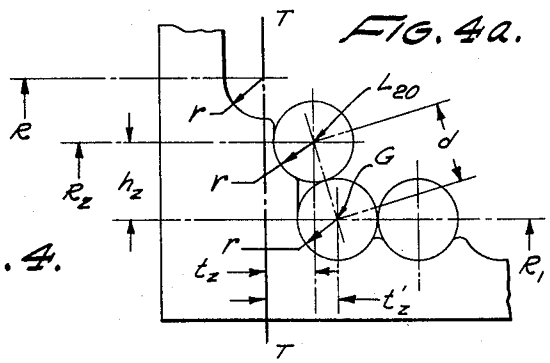
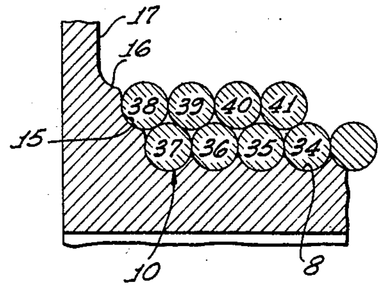
KENNETH W. DUDLEY
INVENTOR.
BY Lyon & Lyon
ATTORNEYS.

CABLE DRUM GROOVING
Filed May 24, 1956 4 Sheets-Sheet 3
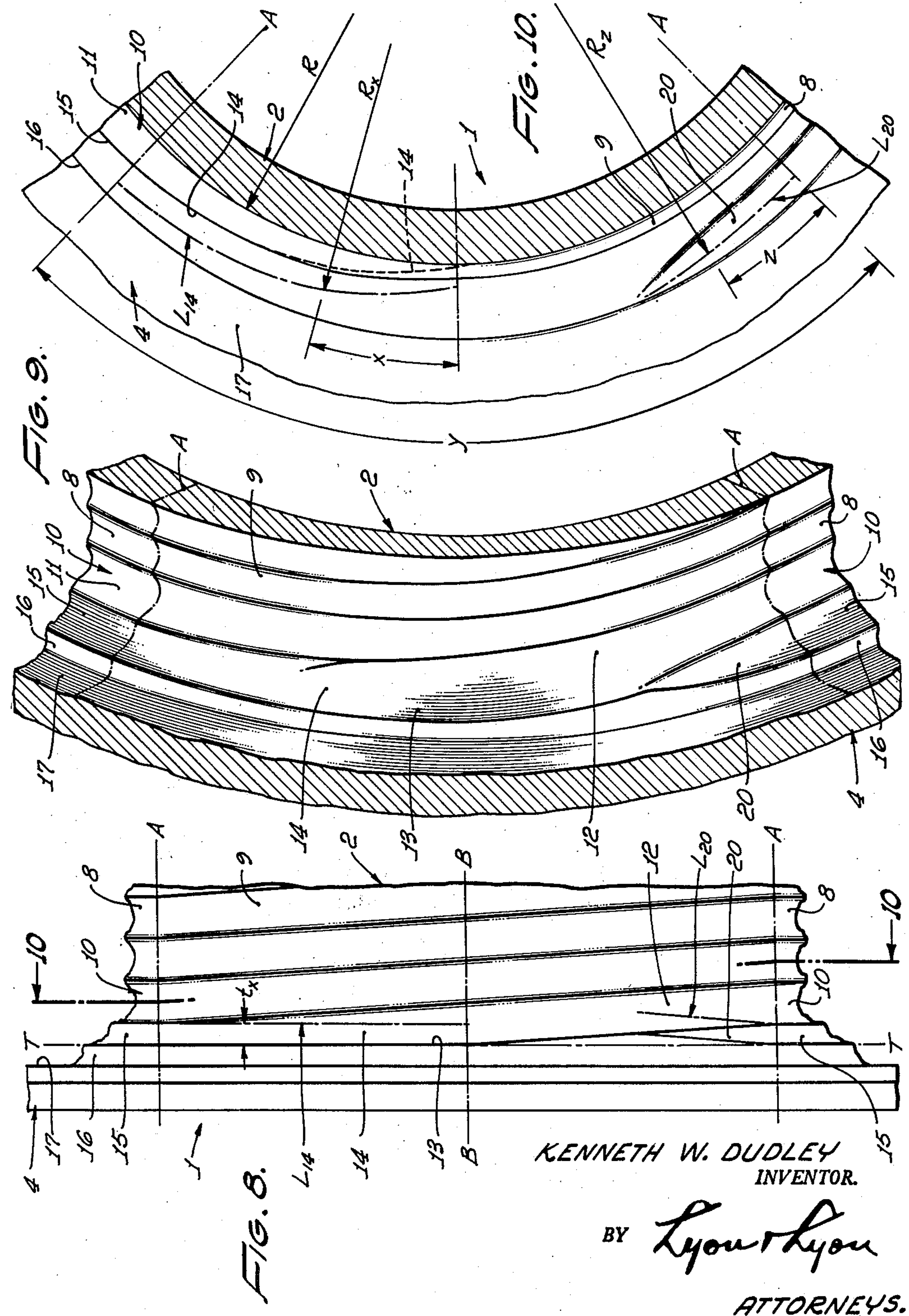
KENNETH W. DUDLEY
INVENTOR.
BY Lyon & Lyon
ATTORNEYS.

June 30, 1959 K. W. DUDLEY 2,892,598

CABLE DRUM GROOVING

Filed May 24, 1956 4 Sheets-Sheet 4

KENNETH W. DUDLEY
INVENTOR.

BY Lyon & Lyon
ATTORNEYS.

United States Patent Office 2,892,598

Patented June 30, 1959

2,892,598

CABLE DRUM GROOVING

Kenneth W. Dudley, Redondo Beach, Calif., assignor, by mesne assignments, to The National Supply Company, Pittsburgh, Pa., a corporation of Ohio Application May 24, 1956, Serial No. 586,974

11 Claims. (Cl. 242—117)

This invention relates to spooling of cable or wire line on a spooling drum and is particularly directed to improvements in the construction of the spooling drum to control the spooling action of the cable on the drum, particularly when several layers of cable are involved. Drums which receive several layers of cable in the spooling operation are commonly used in connection with hoists and drawworks of the type employed in the drilling of wells.

Conventional spooling drums are provided with a smooth or helically grooved cylindrical portion having radial flanges at the ends thereof. One end of the cable is fixed to the drum near one flange and the cable spools in uniform helical fashion until it reaches the other flange. The cable must then rise to the second layer and then spool back toward the first flange with an opposite lead. The uniform helical lead of the first layer does not provide a satisfactory base for succeeding layers because the cable in the second layer must advance against the helix formed by the cable on the first layer. The cable in the second layer crosses over the coils on the first layer in one axial direction, and then follows the helix of the first layer in the other direction for a part of one revolution, thus alternately advancing and retreating in the course of spooling the second layer. When the cable reaches the end of the second layer and begins the third layer, difficulty is encountered because the cable cannot be adequately supported. This is true because the angular location of the end point of the second layer with respect to the drum flange cannot be predetermined with any accuracy. Pinching of the cable at the end of the second layer and the start of the third layer often results.

In order to improve these basic spooling characteristics, some spooling drums have heretofore been provided with cable grooves which are partly parallel and partly helical. Each groove has a first portion which extends around the drum without axial lead, and a second helical portion which advances the cable axially a distance substantially equal to the cable diameter. Such first portion of each groove hereinafter referred to as the parallel portion, extends around the major portion of the periphery, for example, three-quarters of one revolution, while the total helical advance in the second portion completes the remaining one-quarter. In a grooved drum having such parallel and helical portions, the difficulties in spooling of the second and subsequent layers are largely eliminated because the cable in each layer lies in the valley formed by adjacent cables in the lower layer for the major portion of the circumferential length of each coil. The cross-over location where each second-layer coil crosses over a corresponding coil in the first layer remains relatively short in peripheral length. Accordingly spooling in the second and third layers is greatly improved.

Although this combination of parallel and helical grooving for spooling drums has produced definite improvements in spooling characteristics of the cable, it has been found that difficulties are still encountered in securing proper action of the cable as it ends one layer and begins the next layer. In particular, the transition from the first to the second layer has resulted in inadequate support of portions of the cable and pinching thereof in spaces too small to receive the full diameter thereof, with consequent wear on the cable and on the drum flanges.

In accordance with my invention, I provide new and improved means for accomplishing the transition from the first to the second layer of cable wherein the cable is fully supported at all points and is caused to rise from the first layer and to begin the second layer at a definite location in a manner to improve the spooling action on the second layer. This is accomplished by providing a continuous shoulder in the wall of the side flange of the spooling drum and by providing novel groove means for sequentially raising the cable from the first layer and then moving it laterally into the course of the reverse helix for the second layer. A similar continuous annular shoulder is formed on the other flange so that support is provided for the last coil of the second layer of the cable. The cable then raises from the end of the second layer to the beginning of the third layer while being supported laterally against the radial surface of the drum flange at the beginning of the third layer.

From the above description, it will be understood that an important object of my invention is to improve the spooling action of multilayer spooling drums, particularly at the regions adjacent the end flanges to provide full support for the cable. Another object is to provide a grooved spooling drum having such improved spooling characteristics and employing grooves on the main spooling portion of the drum which are parallel for a major portion of their length and helical for the remaining portion.

Other and more detailed objects and advantages will appear hereinafter.

In the drawings:

Figure 1 is a side elevation showing a spooling drum embodying my invention.

Figure 2 is a sectional elevation taken substantially on lines 2—2 as shown on Figure 1 and partly broken away showing three layers of cable in position.

Figures 11, 12:
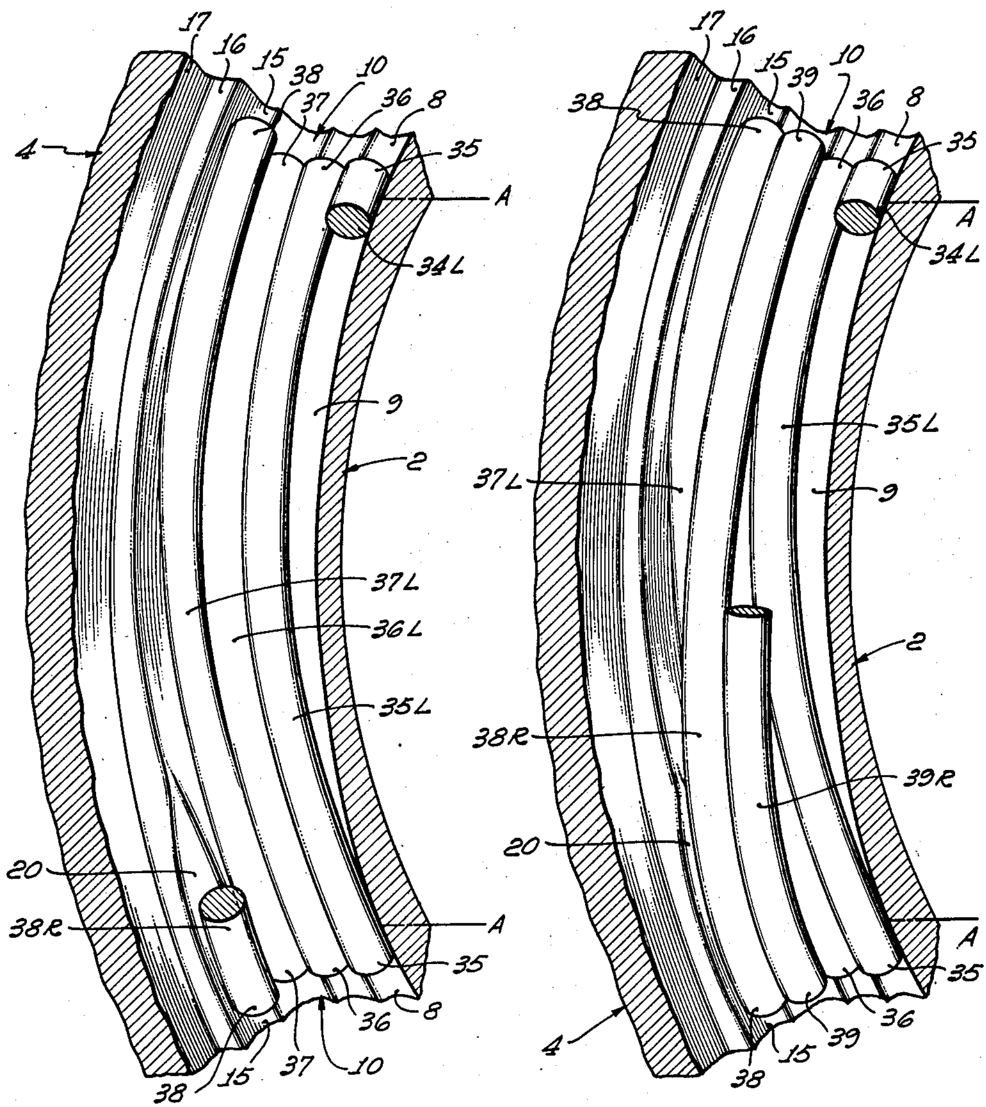

Figures 3, 4, 5, 6 and 7 are fragmentary elevations taken substantially on the lines 3—3, 4—4, 5—5, 6—6 and 7—7 as shown on Figure 1, and illustrating the action of the cable at the transition between the first and second layers.

Figure 4*a* is an enlargement based on Figure 4 and Figure 6*b* is an enlargement based on Figure 6.

Figure 8 is a fragmentary elevation showing in larger scale a portion of the spooling drum illustrated in Figure 1.

Figure 9 is a perspective view partly in section and partly broken away showing the portion of the drum illustrated in Figure 8.

Figure 10 is a sectional detail taken substantially on the lines 10—10 as shown in Figure 8.

Figure 11 is a perspective view similar to Figure 9 showing portions of the first layer of cable in position on the drum.

Figure 12 is a view similar to Figure 11 showing the manner of producing the reverse helical lead on the second layer of cable.

Referring to the drawings, the spooling drum generally designated 1 is provided with a central cylindrical portion 2 having a grooved surface and a pair of end flanges 3 and 4. The drum may be mounted on any suitable shaft or other support and may be provided with conventional driving means and braking means (not shown). An anchor socket 5 is provided on the flange 3 to receive a clamp device 6 mounted on one end of the cable 7. This cable or wire line is preferably of the multiple strand lubricated type commonly used in well drilling drawworks and hoists.

The central portion 2 of the drum 1 is provided with a plurality of grooves of the proper dimensions to receive the cable 7. These grooves are preferably cut or otherwise formed into the parent material of the drum. These grooves are each provided with a parallel portion 8 which extends for approximately three-quarters of the circumference, and a helical portion 9 which extends for the remaining one-quarter of the circumference. As shown in Figure 1, the helical portion of each groove extends between the lines A—A. The last groove 10 on the drum portion 2 adjacent the end flange 4 has a parallel portion 11 which is substantially the same as the parallel portion 8 of all of the other grooves. This parallel portion 11 terminates at the location of the section line 3—3 as shown in Figure 1. The helical portion 12 extends from the location of this section line 3—3 to the location of the line B—B. At the latter location one edge of the groove 12 is coincident with radial surface 13. At this point the helical groove 12 merges with the riser groove 14 which does not have any axial lead, but which has a gradually increasing radius from the drum axis. The riser groove 14 reaches its maximum elevation at the location of the section lines 7—7 as shown in Figure 1.

The flange 4 is provided with a circular shoulder 16 which merges on one edge with the radial surface 17 on the flange. Similarly the flange 3 is provided with a circular shoulder 18 which merges with the radial flange surface 19.

In operation, the cable 7 spools from right to left in the grooves 8 and 9, forming the first layer. The cable eventually reaches the last groove 10 and is spooled in the helical portion 12. Assuming, as an example, that there are 37 coils in the grooves on the first layer, the coil 37 lies in parallel groove 11 and in helical grooves 12 and the riser groove 14. Figures 3 to 7, inclusive, show how the transition from the first layer to the second layer is accomplished. They show how the cable is fully supported at all times. Figure 3 is similar to the left hand portion of Figure 2 and Figure 7 is identical with Figure 3. Since the grooves are parallel from the position shown in Figure 7 to the position shown in Figure 3, all of the transition from the first layer to the second layer occurs between the parallel lines A—A as shown in Figure 1, which mark the boundaries of the cross-over zone.

Figures 4, 5 and 6 show the steps in the transition and these figures are taken at locations between the parallel lines A—A. In these figures the left hand helical lead is designated by the suffix "L," while a right hand helical lead is designated by the suffix "R." From a consideration of Figures 4, 5 and 6, it is apparent that the coil 37L moves to the left in helical groove 12 until it reaches the radial surface 13. It then ceases to move axially and proceeds to move upwardly on the riser groove 14 while in lateral contact with the radial surface 13. When this coil 37 reaches the full height of the second layer as shown at Figure 7 it becomes the start of coil 38 and is so numbered in Figure 7. The coil 38 becomes coil 38R at the location of Figure 4 as it moves axially to the right by reason of its contact with the wedge surface 20. At the location of Figure 5, the coil 38R lies directly above the coil 37L, while at the location of Figure 6 the coil 38R has been shifted further to the right, by its contact with coil 37.

A continuous cable contacting and supporting surface is thus provided on the drum for accomplishing the transition from the last coil 37 on the first layer to the first coil 38 on the second layer. The portions of this surface in their consecutive order are the helical portion 12, the riser portion 14, the circular shoulder 15 and the wedge surface 20.

When coil 38 reaches the valley formed between coils 35L and 36L, it lies at the location of Figure 7 and hence is renumbered 39. Coil 39 continues around, lying in the valley between the parallel coils 36 and 37 and is again moved to the right by reason of its contact with the coil 38R. This movement to the right in the cross-over zone is illustrated in Figures 4, 5 and 6. Coil 39R then becomes coil 40 and the cycle repeats. Each coil in the second layer lies in the valley between parallel coils on the first layer and then crosses over with a right hand helical lead in the cross-over zone between the parallel lines A—A.

If the outside diameter of the cable 7 remained absolutely constant, it would be possible to determine with some degree of accuracy the exact point at which the last coil 75 in the second layer would reach the radial surface 19 on the flange 3. However, variations in tension load on the cable as well as variations due to wear cause some change in the outside diameter of the cable and the cumulative effect of this variation makes it impractical to determine the point of first contact with the end coil 75 and the radial surface 19. The circular shoulder 18, however, serves to support the last second layer coil 75 regardless of the position at which it first touches the radial surface 19.

The cable then moves up to the first third layer coil 76 as shown by the direction of the arrows in Figure 2. The third layer coils each lie in a parallel valley formed between parallel portions of the second layer coils and then cross over with a helical lead to the left in about one-quarter revolution. The cross-over zone in the second and third layers may not remain between the parallel lines A–A but may vary somewhat therefrom depending on variations in the diameter of the cable. The angular length of the cross-over zone, however, does not increase much beyond one-quarter revolution. The last third layer coil 113 rests on the circular supporting shoulder 16 on the flange 4. If desired, a fourth layer of cable may be wrapped on the third layer, the shoulder 16 serving the same function as the shoulder 18.

The shape of the cable supporting and contacting surface 14, 15 and 20 may be described in mathematical terms. The loci of the center of curvature of the riser groove 14 and wedge surface 20 are developed below. The loci are defined in the radial direction by the distance from the rotary axis of the drum, and in the axial direction by the distance from a reference plane parallel to the drum flanges and perpendicular to the drum axis.

The loci of the center of curvature $L_{14}$ of the riser groove 14 at any angle $x$ from section B—B to section 7—7 is defined by the radial distance $R_x$ from the axis of the drum and by the transverse distance $t_x$ from the reference plane T—T.

From section B—B to section 707, $t_x$ remains constant and, $$t_x=\frac{d}{2}=r. \quad \text{(See Figure 6}b.\text{)}$$

In the radial direction, $$R_x=R_1+h_x$$

The quantity $h_x$ increases from $h_x=0$ at section B—B as $t'_x$ decreases from $t'=d$ at section B—B to $$t'=\frac{d}{2}$$

at section 7—7. Considering the right triangle formed by $d$, $t'_x$ and $h_x$, $$h_x=\sqrt{d^2-(t'_x)^2}$$

Since the center of groove F describes a helix of pitch $d$ through the angle $y$, $t'_x$ may be written as $$t'_x=d-\frac{x}{y}d=\left(1-\frac{x}{y}\right)$$

Therefore $$h_x=\sqrt{d^2-d^2\left(1-\frac{x}{y}\right)^2}=d\sqrt{1-\left(1-\frac{x}{y}\right)^2}$$

and, $$R_x=R_1+h_x=R+\frac{d}{2}+d\sqrt{1-\left(1-\frac{x}{y}\right)^2}$$

The loci of the center of curvature $L_{20}$ of the return wedge 20 at any angle $z$ between sections 3—3 and 5—5 is defined by the radial distance $R_z$ and the transverse distance $t_z$.

With reference to Figure 4*a*, in the transverse direction the center of curvature $L_{20}$ describes a helix equal to the helix formed by F above, but in the opposite direction. At section 3—3, $$t=\frac{d}{2}$$

therefore at any angle $z$, $$t_z=\frac{d}{2}+\frac{z}{y}d=d\left(\frac{1}{2}+\frac{z}{y}\right)$$

In the radial direction;

$$R_z=R_1+h_z$$

In Figure 4*a* considering the right triangle formed by $h_z$, $d$, and $(t'_z-t_z)$ $$h_z=\sqrt{d^2-(t'_z-t_z)^2}$$

The center of groove G describes a helix parallel to that described by F, and at section 3—3 $t'_z=d$. Therefore at any angle $z$, $$t'_z=d-\frac{z}{y}d=d\left(1-\frac{z}{y}\right)$$

$$t'_z-t_z=d\left(1-\frac{z}{y}\right)-d\left(\frac{1}{2}+\frac{z}{y}\right)=d\left(\frac{1}{2}-\frac{2z}{y}\right)$$

$$h_z=\sqrt{d^2-d^2\left(\frac{1}{2}-\frac{2z}{y}\right)^2}=d\sqrt{1-\left(\frac{1}{2}-\frac{2z}{y}\right)^2}$$

$$R_z=R+\frac{d}{2}+d\sqrt{1-\left(\frac{1}{2}-\frac{2z}{y}\right)^2}$$

Having fully described my invention, it is to be understood that I do not wish to be limited to the details herein set forth, but my invention is of the full scope of the appended claims.

I claim:

1. In a cable spooling drum, the improvement comprising: a riser groove in the drum shaped to receive the cable, the loci of the center of curvature of the riser groove being in a plane transverse to the drum axis and being defined by the following equation:

$$R_x=R+\frac{d}{2}+d\sqrt{1-\left(1-\frac{x}{y}\right)^2}$$

where:

$R_x$=radial distance from drum axis (variable)
$R$=spooling radius at beginning end of riser groove (constant)
$d$=diameter of cable (constant)
$x$=angular length from beginning end of riser groove (variable)
$y$=twice angular length of riser groove (constant)

2. In a spooling drum having a pair of end flanges and a cable spooling portion therebetween, the improvement comprising: a series of cable-receiving grooves in the spooling portion of the drum, each groove having a long portion parallel to the end flanges, each groove also having a short helical portion with an axial lead substantially equal to the diameter of the cable, a riser groove in the drum at one end of the spooling portion and shaped to receive the cable, the loci of the center of curvature of the riser groove lying in a plane transverse to the drum axis and being defined by the following equation:

$$R_x=R+\frac{d}{2}+d\sqrt{1-\left(1-\frac{x}{y}\right)^2}$$

where:

$R_x$=radial distance from drum axis (variable)
$R$=radius of drum spooling portion (constant)
$d$=diameter of cable (constant)
$x$=angular length from beginning end of riser groove (variable)
$y$=twice angular length of riser groove (constant)

3. In a cable spooling drum, the improvement comprising: a wedge surface on the drum shaped to contact the cable, the loci of the center of curvature of the wedge surface being defined by the following equations:

$$t_z=d\left(\frac{1}{2}+\frac{z}{y}\right)$$

$$R_z=R+\frac{d}{2}+d\sqrt{1-\left(\frac{1}{2}-\frac{2z}{y}\right)^2}$$

where:

$R_z$=radial distance from drum axis to wedge surface center of curvature (variable)
$R$=spooling radius at beginning end of riser groove (constant)
$d$=diameter of cable (constant)
$t_z$=axial distance from a radial plane tangent to the shoulder (variable)
$y$=four times angular length of wedge surface (constant)
$z$=angular length from beginning end of wedge surface (variable)

4. In a spooling drum having a pair of end flanges and a cable spooling portion therebetween, the improvement comprising: a series of cable-receiving grooves in the spooling portion of the drum, each groove having a long portion parallel to the end flanges and a short helical portion with an axial lead substantially equal to the diameter of the cable, a riser groove in the drum at one end of the spooling portion and shaped to receive the cable, a shoulder of constant diameter extending around the drum from the riser groove, a wedge surface at the end of the shoulder and shaped to contact the cable, the loci of the center of curvature of the wedge surface being defined by the following equations:

$$t_z=d\left(\frac{1}{2}+\frac{z}{y}\right)$$

$$R_z=R+\frac{d}{2}+d\sqrt{1-\left(\frac{1}{2}-\frac{2z}{y}\right)^2}$$

where:

$R_z$=radial distance from drum axis to wedge surface center of curvature (variable)
$R$=spooling radius at beginning end of riser groove (constant)
$d$=diameter of cable (constant)
$t_z$=axial distance from a radial plane tangent to the shoulder (constant)
$y$=angular length of helical portions of grooves (constant)
$z$=angular length from beginning end of wedge surface (variable)

5. In a cable spooling drum, the improvement comprising: a riser groove in the drum shaped to receive the cable, a shoulder of constant diameter extending around the drum from the riser groove, a wedge surface at the end of the shoulder and shaped to contact the cable, the loci of the center of curvature of the riser groove being in a plane transverse to the drum axis and being defined by the following equation:

$$R_x=R+\frac{d}{2}+d\sqrt{1-\left(1-\frac{x}{y}\right)^2}$$

and the loci of the center of curvature of the wedge surface being defined by the following equations:

$$t_z=d\left(\frac{1}{2}+\frac{z}{y}\right)$$

$$R_z=R+\frac{d}{2}+d\sqrt{1-\left(\frac{1}{2}-\frac{2z}{y}\right)^2}$$

where:

$R_x$=radial distance from drum axis to riser groove center of curvature (variable)
$R_z$=radial distance from drum axis to wedge surface center of curvature (variable)
$R$=spooling radius at beginning end of riser groove (constant)
$d$=diameter of cable (constant)
$t_z$=axial distance from a radial plane tangent to the shoulder (constant)
$x$=angular length from beginning end of riser groove (variable)
$y$=twice angular length of riser groove (constant)
$z$=angular length from beginning end of wedge surface (variable)

6. In a spooling drum having a pair of end flanges and a cable spooling portion therebetween, the improvement comprising: a series of cable-receiving grooves in the spooling portion of the drum, each groove having a long portion parallel to the end flanges and a short helical portion with an axial lead substantially equal to the diameter of the cable, a riser groove in the drum at one end of the spooling portion and shaped to receive the cable, the loci of the center of curvature of the riser groove lying in a plane transverse to the drum axis and being defined by the following equation:

$$R_x=R+\frac{d}{2}+d\sqrt{1-\left(1-\frac{x}{y}\right)^2}$$

a wedge surface on the drum shaped to contact the cable, and the loci of the center of curvature of the wedge surface being defined by the following equations:

$$t_z=d\left(\frac{1}{2}+\frac{z}{y}\right)$$

$$R_z=R+\frac{d}{2}+d\sqrt{1-\left(\frac{1}{2}-\frac{2z}{y}\right)^2}$$

where:

$R_x$=radial distance from drum axis to riser grove center of curvature (variable)
$R_z$=radial distance from drum axis to wedge surface center of curvature (variable)
$R$=spooling radius at beginning end of riser groove (constant)
$d$=diameter of cable (constant)
$t_z$=axial distance from a radial plane tangent to the shoulder (variable)
$x$=angular length from beginning end of riser groove (variable)
$y$=angular length of helical portions of grooves (constant)
$z$=angular length from beginning end of wedge surface (variable)

7. In a spooling drum having a pair of end flanges and a cable spooling portion therebetween, the improvement comprising: a series of cable-receiving grooves in the spooling portion of the drum, each groove having a long portion parallel to the drum flanges and a helical portion having an axial lead, one of the latter said portions lying adjacent one of the end flanges, a riser groove leading from the latter said helical portion with increasing diameter and being parallel to the end flange, a shoulder of constant diameter extending from the riser groove for a substantially greater arcuate length than the total combined arcuate lengths of the helical portion and riser groove, and a wedge surface with a helical lead in the opposite direction at the other end of the shoulder.

8. In a spooling drum having a pair of end flanges and a cable spooling portion therebetween, the improvement comprising: a series of cable-receiving grooves in the spooling portion of the drum, each groove having a long portion parallel to the drum flanges and a helical portion having an axial lead, one of the latter said portions lying adjacent one of the end flanges, a riser groove leading from the latter said helical portion with increasing diameter and being parallel to the end flange, a shoulder of constant diameter extending from the riser groove for substantially the same arcuate length as the long groove portions parallel to the drum flanges, and a wedge surface with a helical lead in the opposite direction at the other end of the shoulder.

9. In a spooling drum having a pair of end flanges and a cable spooling portion therebetween, the improvement comprising: a series of cable-receiving grooves in the spooling portion of the drum, the grooves having portions parallel to the drum flanges and helical portions provided with an axial lead, one of the latter said portions lying adjacent one of the end flanges, a riser groove leading from the latter said helical portion with increasing diameter and being parallel to the end flanges, a shoulder of constant diameter extending from the riser groove for a substantially greater arcuate length than the arcuate length of the riser groove, and a wedge surface with a helical lead in the opposite direction at the other end of the shoulder.

10. In a spooling drum having a pair of end flanges and a cable spooling portion therebetween and having means for fixing one end of a cable adjacent one of the end flanges, the improvement comprising: a series of cable-receiving grooves in the spooling portion of the drum, each groove having a long portion parallel to the end flanges and a helical portion having an axial lead, one of the latter said portions lying adjacent the second end flange, a riser groove leading from the latter said helical portion with increasing diameter and being parallel to said second end flange, a shoulder of constant diameter extending from the riser groove for a substantially greater arcuate length than the total combined arcuate length of the helical portion and riser groove, a wedge surface with a helical lead in the opposite direction at the other end of the shoulder, whereby the cable may be spooled in said series of cable-receiving grooves in the spooling portion of the drum and then spooled successively on the riser groove, shoulder, and wedge surface and then spooled in a second layer back to the first said end flange, and a shoulder of constant diameter on the first said end flange adapted to support the last turn of cable in the second layer.

11. In a spooling drum having a pair of end flanges and a cable spooling portion therebetween, and having means for fixing one end of a cable adjacent a first of the end flanges, the improvement comprising: a series of cable-receiving grooves in the spooling portion of the drum, the grooves having portions parallel to the drum flanges and helical portions provided with an axial lead, one of the latter said portions lying adjacent the second of the end flanges, a riser groove leading from the latter said helical portion with increasing diameter and being parallel to said second end flange, a shoulder of constant diameter extending from the riser groove for a substantially greater arcuate length then the arcuate length of the riser groove, a wedge surface with a helical lead in the opposite direction at the other end of said shoulder, whereby the cable may be spooled in said series of cable-receiving grooves in the spooling portion of the drum and spooled successively on the riser groove, shoulder, and wedge surface, and spooled in a second layer back to the first said end flange, and a shoulder of constant diameter on the first said end flange adapted to support the last turn of cable on the second layer.

References Cited in the file of this patent

UNITED STATES PATENTS

| | | |
|---|---|---|
| 1,984,604 | Stahl | Dec. 18, 1934 |
| 2,420,050 | Maude | May 6, 1947 |
| 2,620,996 | Le Bus | Dec. 9, 1952 |